UNITED STATES PATENT OFFICE.

GUSTAV MOLT, OF MILLBURY, MASSACHUSETTS.

IMPROVEMENT IN INDIGO-BLUE VATS FOR COLORING WOOL AND COTTON.

Specification forming part of Letters Patent No. 134,694, dated January 7, 1873.

*To all whom it may concern:*

Be it known that I, GUSTAV MOLT, of Millbury, in the county of Worcester and Commonwealth of Massachusetts, have invented a new Indigo-Blue Vat, to be used in coloring wool and cotton without the use of woad, madder, sirup, or vitriol, or any fermentation, of which the following is a specification:

The nature of the invention of the said GUSTAV MOLT consists in dissolving indigo in a solution of lime, soda-ash, and muriate of tin crystals.

To prepare my indigo-blue vat I take equal parts of lime and soda-ash, in the proportion of two (2) of each, by weight, to one, (1,) by weight, of indigo, to be ultimately used. I slake my lime in water and dissolve the soda-ash in hot water, and mix the two. From this mixture I precipitate the lime by adding cold water, and save the clear liquor remaining for use, and call it composition No. 1.

I then dissolve muriate-of-tin crystals in water, using one-half in weight of indigo ultimately to be used. I then dissolve an equal weight of soda-ash in a separate vessel, and add slowly this last solution to the solution of muriate-of-tin crystals until fermentation ceases. To this I add cold water; let it stand until settled, and reserve the precipitate for use, and call it composition No. 2.

I then mix compositions Nos. 1 and 2, and to the solution resulting I add ground indigo in the proportion of one pound of indigo to two pounds of lime used in composition No. 1, and raise the whole to 160° Fahrenheit, and this I call composition No. 3.

To color with this I heat clear water to 120° Fahrenheit, add composition No. 3 in quantities sufficient to produce the desired shade, and add bran as may be necessary to regulate the alkalies.

I claim the following advantages for my indigo-blue vat over any other known to dyers, viz: First, no loss of indigo by washing; second, a perfectly-fast color; third, a greater degree of luster; fourth, the vat can never be "lost;" fifth, there is no sediment, and vat can be used without intermission; sixth, the vat needs care only when in actual use; seventh, the use of a lower degree of temperature in dyeing injures the fabric less, and leaves it softer and in better condition for subsequent operations.

I claim as my invention—

The compound composed of lime and soda-ash, and called composition No. 1; and the compound composed of muriate-of-tin crystals and soda-ash, called composition No. 2; and the composition composed of compositions Nos. 1 and 2, and called composition No. 3, in the foregoing specification, substantially in the proportions and for the purpose herein set forth.

GUSTAV MOLT.

Witnesses:
 JOHN HOPKINS,
 HENRY A. AIKEN.